United States Patent
Fioravanti et al.

(10) Patent No.: US 6,483,657 B1
(45) Date of Patent: Nov. 19, 2002

(54) HEAD FLIGHT CHARACTERIZATION USING THERMAL ASPERITY DETECTION

(75) Inventors: Louis J. Fioravanti, Boulder, CO (US); Kent D. Dillin, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/395,456

(22) Filed: Sep. 14, 1999

Related U.S. Application Data

(60) Provisional application No. 60/100,238, filed on Sep. 14, 1998.

(51) Int. Cl.$^7$ .............................................. G11B 21/02
(52) U.S. Cl. ........................................ 360/75; 360/25
(58) Field of Search ...................... 360/75, 25, 73.03, 360/31

(56) References Cited

U.S. PATENT DOCUMENTS

| | | | |
|---|---|---|---|
| 4,416,144 A | | 11/1983 | Chen et al. |
| 4,724,392 A | | 2/1988 | Bandara et al. |
| 4,872,071 A | | 10/1989 | Easton et al. |
| 5,412,519 A | * | 5/1995 | Buettner et al. ......... 360/73.03 |
| 5,527,110 A | * | 6/1996 | Abraham et al. ......... 360/75 X |
| 5,838,514 A | * | 11/1998 | Smith et al. .................. 360/75 |
| 5,859,358 A | | 1/1999 | Wood et al. |
| 5,991,114 A | * | 11/1999 | Haung et al. ................. 360/75 |
| 6,239,936 B1 | * | 5/2001 | Abraham et al. ............. 360/75 |

FOREIGN PATENT DOCUMENTS

JP 62-132283 6/1987

* cited by examiner

Primary Examiner—David Hudspeth
Assistant Examiner—K. Wong
(74) Attorney, Agent, or Firm—Fellers, Snider, et al.

(57) ABSTRACT

A method for evaluating head flight characteristics in a disc drive includes accelerating a disc to an initial rotational velocity sufficient to aerodynamically support a head over the disc at a nominal flying height. A read bias current is applied to the head to generate a readback signal determined in relation to the voltage drop across the head. A thermal asperity threshold level is applied which the readback signal exceeds in response to contact between the head and the disc as the disc rotates. A head touchdown velocity is determined by decelerating the disc to decrease the flying height of the head and detecting subsequent contact between the head and the disc when the readback signal exceeds the thermal asperity threshold level. A head take off velocity is similarly determined by monitoring the head readback signal as the disc is accelerated and lifts off the disc.

12 Claims, 5 Drawing Sheets

HEAD FLIGHT CHARACTERIZATION USING THERMAL ASPERITY DETECTION

RELATED APPLICATIONS

This application claims the benefit of Provisional Application No. 60/100,238 filed Sep. 14, 1998.

FIELD OF THE INVENTION

This invention relates generally to the field of disc drive storage devices, and more particularly, but not by way of limitation, to improvements in the detection of head flight characteristics in a disc drive.

BACKGROUND OF THE INVENTION

Disc drives are commonly used as the primary data storage and retrieval devices in modem computer systems. In a typical disc drive, user data are magnetically stored on one or more discs that are rotated at a constant high speed and accessed by a rotary actuator assembly having a plurality of read/write heads that fly adjacent the surfaces of the discs.

When the disc drive is deactivated, the heads are typically moved from an aerodynamically supported position over data recording portions of the discs and brought to rest onto texturized landing zone portions of the discs. More particularly, the heads are said to "touchdown" onto the landing zones as the disc rotational velocity decreases to a level just insufficient to continue to aerodynamically support the heads. Once the heads are located over the landing zones, a latch secures the actuator assembly to prevent inadvertent movement of the heads out onto the data recording portions of the disc as a result of a mechanical shock to the deactivated disc drive.

Upon subsequent reinitialization of the drive, current is applied to a spindle motor to accelerate the discs to operational velocity and the heads "takeoff" from the landing zones when the velocity of the discs reach a sufficient takeoff velocity just sufficient to aerodynamically support the heads. The actuator assembly is thereafter unlatched and the heads are moved out over the data recording portions for normal disc drive operation.

It is desirable for a variety of reasons to determine with some precision the respective disc velocities at which the heads take off and touchdown. Heads are typically mounted on "slider" assemblies which provide the requisite aerodynamic features that enable the heads to fly above the disc surfaces; hence, head take off and touchdown information is useful in evaluating the performance of various alternative slider designs. Moreover, since disc drives typically use the spindle motors as generators when power is removed from the drives and use this derived power to quickly move the heads to a latched position over the landing zones before the discs come to rest, information regarding head take off and touchdown characteristics is invaluable in configuring the deinitialization operation of new drive designs. Another area where head flight characteristics are periodically measured is during extended reliability testing where a population of drives is operated over a long period of time to observe changes in operational performance.

One prior art approach to determining head take off and touchdown information involves the use of an acoustic emissions (AE) sensor which basically comprises a tiny microphone (transducer) that is bonded to the actuator assembly near the heads. Since a great deal of audible noise is generated as the heads drag along the discs (before take off), and this noise is removed when the heads subsequently separate from the discs, the AE sensor has been used to detect this change in acoustic output and correlate this change to the rotational velocity of the discs.

While operable, this and other similar prior art approaches have suffered from various drawbacks. Insertion of an AE sensor requires that the protective housing surrounding the discs and heads be opened, both allowing for the introduction of contaminants into the housing as well as altering the mechanical configuration of the disc drive. Moreover, the bonding of the extraneous sensor to the actuator assembly, usually carried out using an adhesive, provides additional risk of contamination to the disc drive, and adversely introducing uncertainties in the observed data.

Accordingly, there is a need for improvements in the art to enable disc drive manufacturers to evaluate head flight characteristics in a noninvasive and easily implementable manner. It is to such improvements that the present invention is directed.

SUMMARY OF THE INVENTION

The present invention is directed to a method for evaluating head flight characteristics in a disc drive.

In accordance with preferred embodiments, a methodology is first presented to identify a head touchdown velocity. A disc of a disc drive is first accelerated to an initial rotational velocity sufficient to aerodynamically support a head over the disc at a nominal flying height. Next, an appropriate read bias current of selected magnitude is applied to a read element of the head to generate a readback signal determined in relation to voltage drop across the read element. A thermal asperity threshold level is also selected and applied which the readback signal exceeds in response to contact between the head and the disc as the disc rotates.

Thereafter, the head touchdown velocity is determined as a velocity just insufficient to aerodynamically support the head by decelerating the disc to decrease the flying height of the head and detecting subsequent contact between the head and the disc when the readback signal exceeds the thermal asperity threshold level.

Further, a methodology is provided to determine a head take off velocity. First, rotation of the disc is initiated while the head remains in contact with the disc. Next, appropriate read bias currents and thermal asperity threshold levels are selected and applied. The head takeoff velocity is thereafter determined as a velocity just sufficient to aerodynamically support the head by detecting lift off of the head from the disc as the readback signal falls below the thermal asperity threshold level.

With knowledge of the head take off and touchdown velocities, the distances (in disc revolutions) that the head remains in contact with the disc before take off and after touchdown can be determined.

These and various other features as well as advantages which characterize the present invention will be apparent from a reading of the following detailed description and a review of the associated drawings.

BRIEF DESCRIPTION OF THE DRAWINGS

FIG. 8 is a graphical representation of the acceleration of the disc of FIG. 1 and the detection of the point at which the head separates from the disc as indicated by a change in the readback signal.

DETAILED DESCRIPTION

Figure 1:
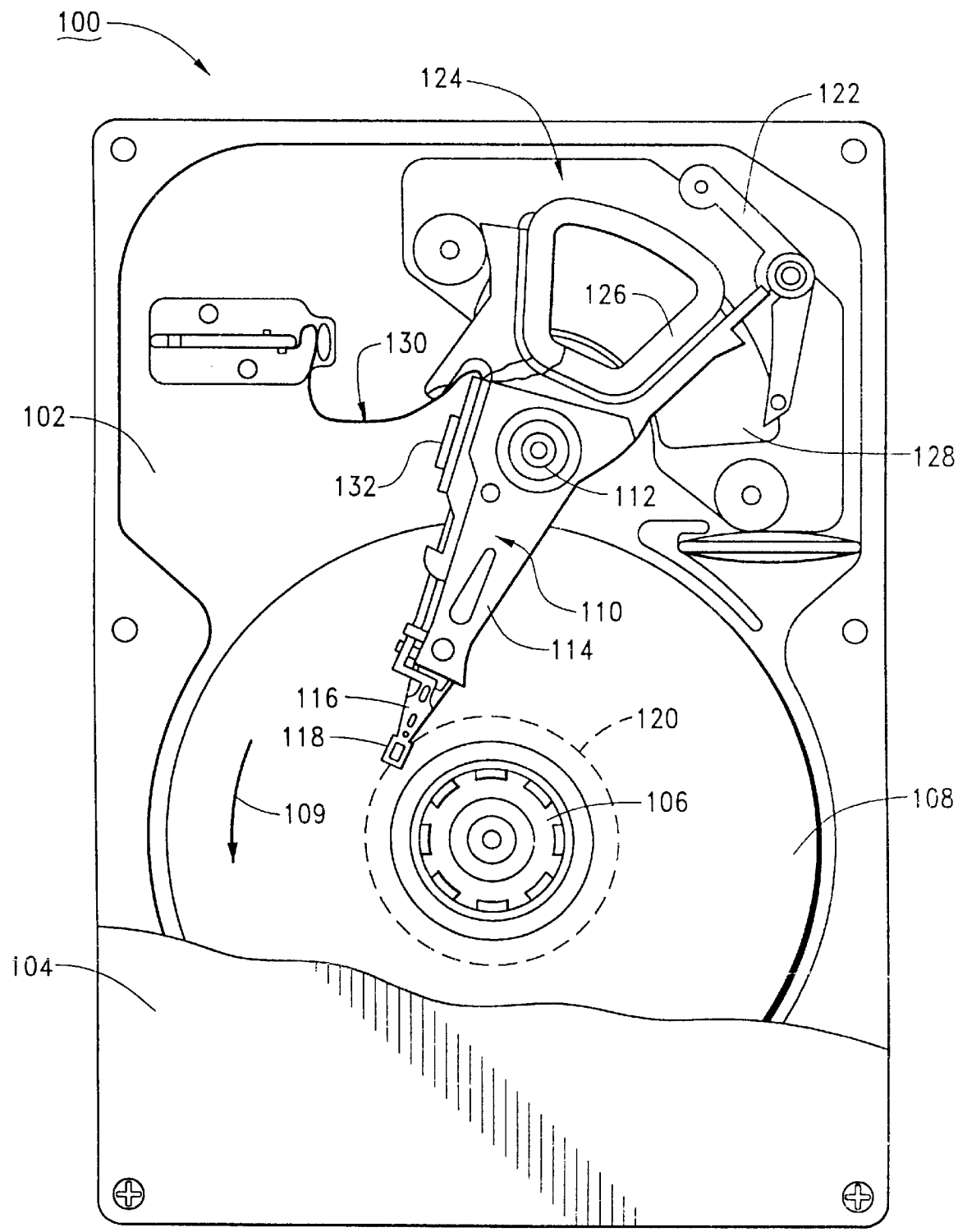
FIG. 1 shows a top plan view of a disc drive in which preferred embodiments of the present invention can be readily practiced.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant velocity (in thousands of revolutions per minute) as indicated by vector 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108, with flexible suspension assemblies 116 (flexures) extending therefrom. Mounted at the distal end of each of the flexures 116 is a head 118 which includes a slider assembly (not separately designated) designed to fly in close proximity to the corresponding surface of the associated disc 108. The heads 118 are preferably characterized as magneto-resistive (MR) heads each having a thin-film inductive write element and an MR read element.

When the disc drive 100 is not in use, the heads 118 are moved over and come to rest upon landing zones 120 near the inner diameter of the discs 108 and the actuator assembly 110 is secured using a magnetic latch assembly 122. Such operation will be discussed in greater detail below.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. A second magnetic flux path is disposed above the permanent magnet 128, but has not been shown for purposes of clarity. The heads 118 are moved across the surfaces of the discs 108 through the application of current to the coil 126.

A flex assembly 130 provides the requisite electrical connection paths for the actuator assembly 110 while allowing pivotal movement of the actuator assembly 110 during operation. The flex assembly 130 includes a preamplifier/driver circuit 132 (preamp) which applies write currents to the write elements of the heads 118 during a write operation and applies read bias currents to the MR read elements of the heads 118 during a read operation. The preamp 132 further amplifies readback signals obtained during a read operation and provides the same to disc drive control electronics (not shown) disposed on a disc drive printed circuit board (PCB) attached to the underside of the base deck 102.

Figure 2:
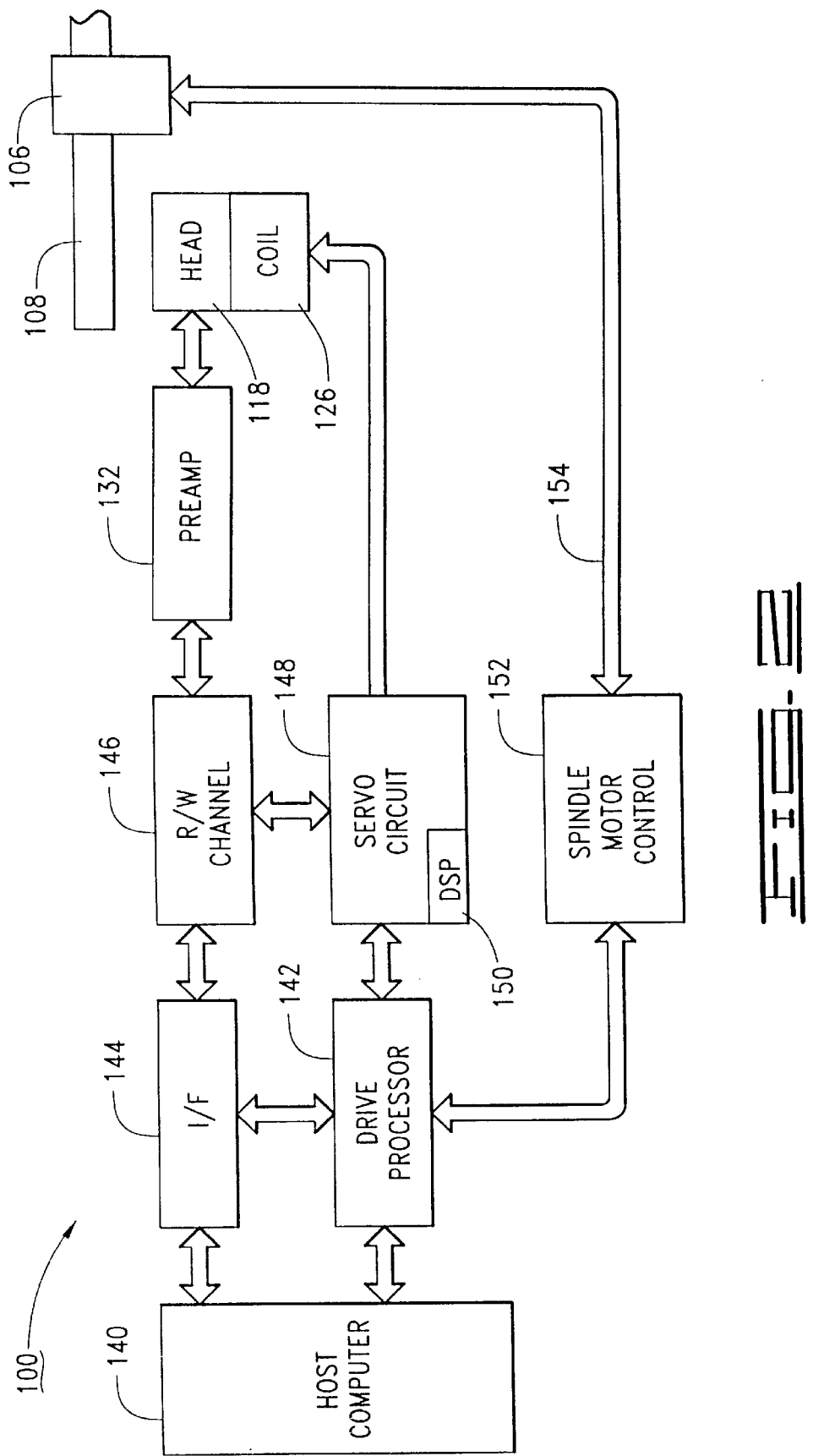
FIG. 2 provides a functional block diagram of the disc drive of FIG. 1 in conjunction with an associated host computer.

FIG. 2 shows a functional block diagram of the disc drive 100 of FIG. 1, in conjunction with an associated host computer 140. At this point it will be noted that the host computer 140 is configured to interface with the disc drive 100 in a conventional fashion, except that the host computer 140 is preferably further equipped with programming to enable a user to carry out the head flight characteristics routines discussed herein, and may also include a conventional data acquisition card configured to obtain measurements from the disc drive 100.

The disc drive 100 includes a drive processor 142 which carries out top level control functions for the drive. User data to be stored to the discs 108 are passed from the host computer 140 to an interface (I/F) circuit 144 which buffers and sequences the data, a read/write (R/W) channel 146 which encodes and serializes the data, and the preamp 132, which applies a series of alternating write currents to a write element of the head 118 in order to selectively magnetize the disc 108. During a read operation, the preamp 132 applies a read bias current to a read element of the head 118 and transduces the selective magnetization of the disc 108 in relation to changes in voltage across the read element. This results in readback signals correlated to the originally written data. The readback signals are decoded by the R/W channel 146 and passed via the I/F circuit 144 to the host computer 140. The basic construction and operation of such circuits are well understood by those skilled in the art, and so further explanation is not deemed necessary to an understanding of the present invention as disclosed herein.

FIG. 2 further shows a servo circuit 148 which receives readback signals from servo data written to the discs 108 and, in response, applies current to the coil 126 in order to control the position of the heads 118. The servo circuit 148 is shown to be processor-based, in that the circuit includes a digital signal processor (DSP) 150. Finally, FIG. 2 provides a spindle motor control circuit 152 which, in response to commands from the drive processor 142, applies multi-phase currents to the spindle motor 106 to rotate the discs 108. Although the disc drive 100 is designed to nominally operate with the discs 108 rotated at a constant high velocity, it will be appreciated that the drive processor 142 can readily cause the discs 108 to rotate at lower velocities. Moreover, actual measurements of the rotational velocity of the discs can readily be obtained by accessing the appropriate signal lines (functionally represented by path 154) used to supply the drive currents to the spindle motor 106.

Figure 3:
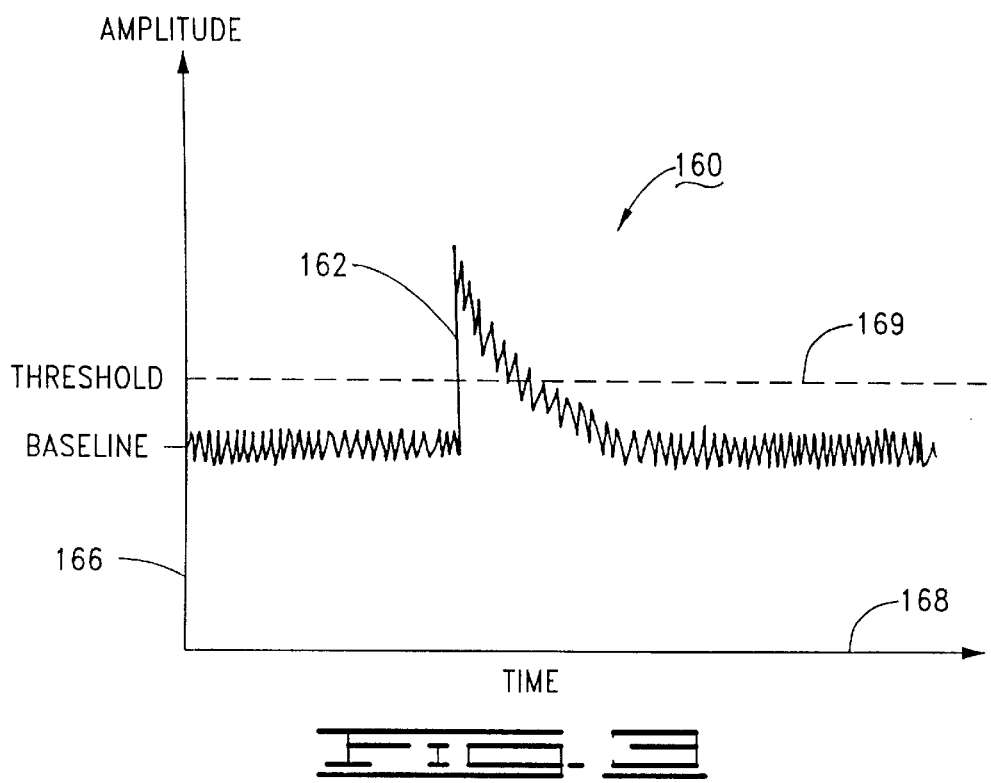
FIG. 3 is a graphical illustration of the effects of a thermal asperity upon a readback signal of the disc drive of FIG. 1.

FIG. 3 is a graphical representation of a readback signal obtained from the head 118 of FIG. 2 and generally denoted at 160. It will be recognized that the readback signal 160 includes a disturbance (denoted at 162) commonly referred to as a "thermal asperity," which results in a substantial increase in amplitude (as measured against amplitude y-axis 166) and a gradual decay over time back to the initial baseline level of the signal (as measured against time x-axis 168). A thermal asperity generally arises when the head 118 comes into contact with a contaminating particle on the disc (or a high point of the disc itself). Because magneto-resistive elements are very sensitive and detect small magnetic domains through changes in electrical resistance, the kinetic impact of the head 118 and the disc 108 (or a particle thereon) is sufficient to cause a rapid heating of the head 118, altering the readback signal for a short period of time as illustrated in FIG. 3.

With the widespread adoption of MR heads by the disc drive industry, as well as heads employing generally similar technologies such as giant magneto-resistive (GMR) and spin-valve, preamp manufacturers have included the use of detection circuitry which applies a predetermined threshold to the readback signal, thereby detecting the presence of a thermal asperity (TA) when the readback signal exceeds the threshold. Such a threshold is shown in FIG. 3 at 169. Since a typical thermal asperity event lasts long enough to distort several bytes of successively read data, the ability of the preamp to send a "TA detect" signal as an erasure pointer to the read/write channel 146 to point out the particular bytes affected by the TA event can result in improved error recovery efforts.

Figure 4:
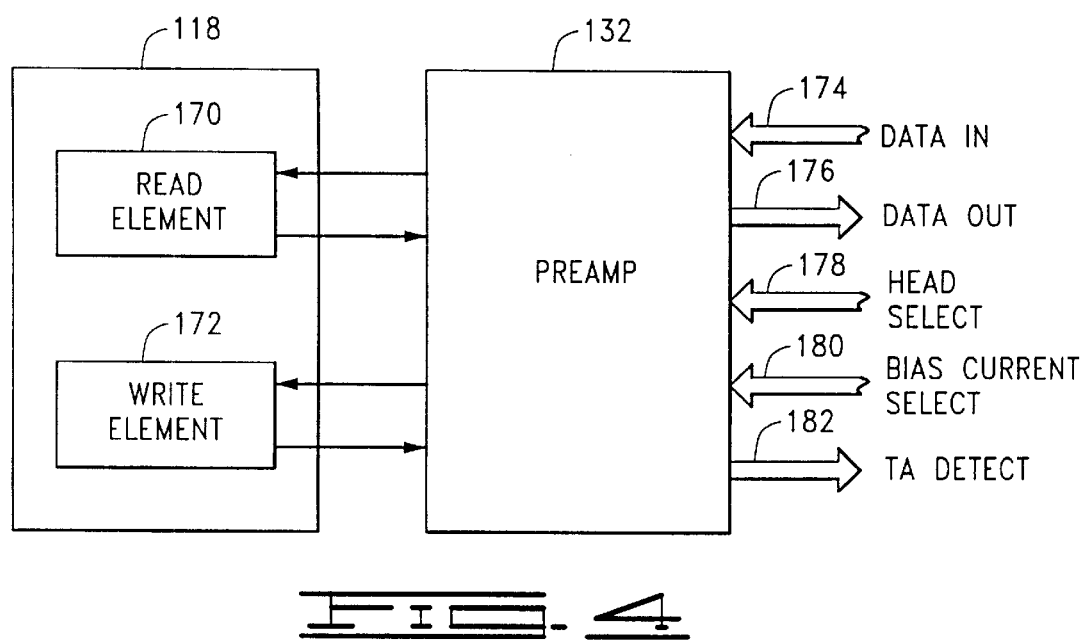
FIG. 4 is a functional block diagram showing the operation of the preamp and a selected head of the disc drive of FIG. 1.

The general functional interrelationship between the preamp 132 and a selected head 118 is set forth by FIG. 4. It will be noted that the head 118 includes an MR read element (shown at 170) and a thin-film inductive write element (shown at 172), each of which are separately accessed by the preamp 132. For reference, the preamp transfers data via signal paths 174, 176, receives head selection and read bias current level selection inputs on paths 178, 180 (from the DSP 150), and outputs the TA detect signal on path 182.

Figures 5, 7:
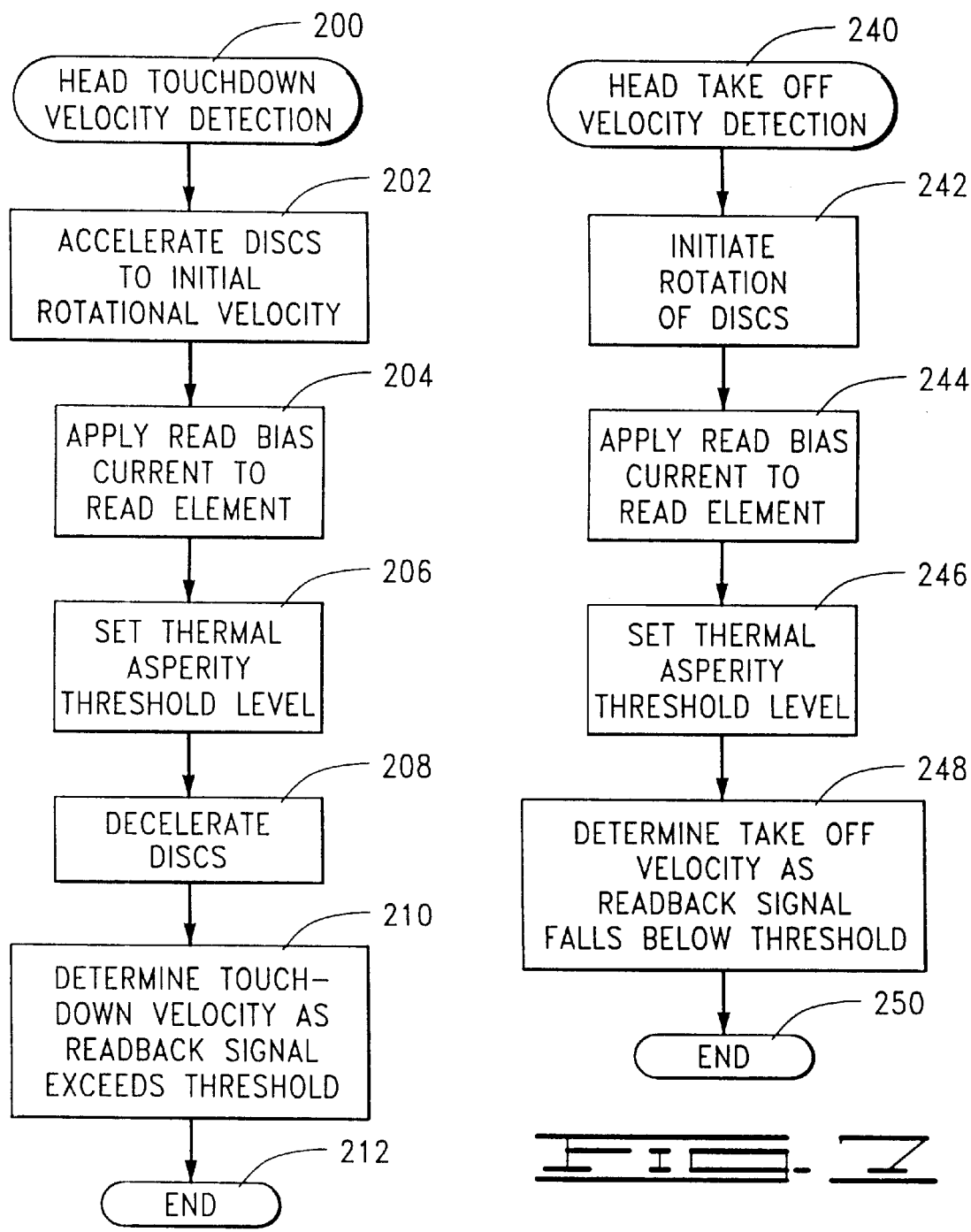
FIG. 5 is a flow chart for a HEAD TOUCHDOWN VELOCITY DETECTION routine, illustrative of steps carried out in accordance with preferred embodiments of the present invention.
FIG. 7 is a flow chart for a HEAD TAKE OFF VELOCITY DETECTION routine, illustrative of steps carried out in accordance with preferred embodiments of the present invention.
Figure 5:
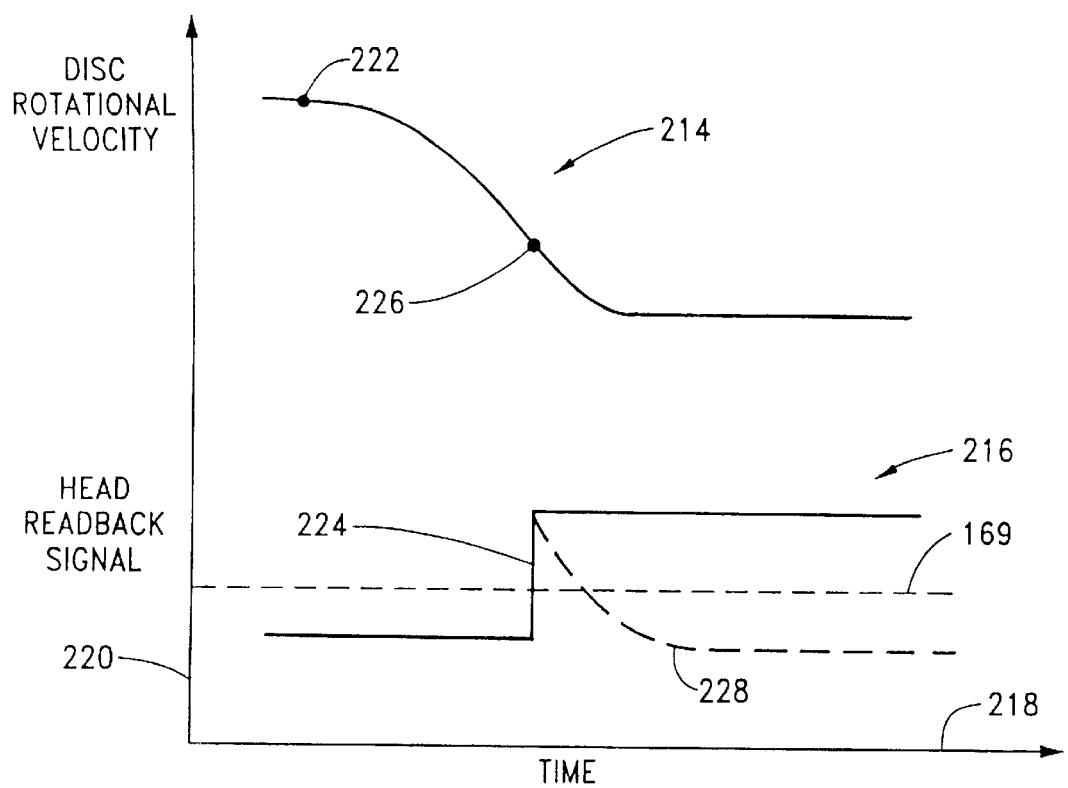

The present invention, as embodied herein, takes advantage of this capability of detecting thermal asperities to provide an efficient methodology for evaluating head flight characteristics. Referring now to FIG. 5, shown therein is a flow chart for a HEAD TOUCHDOWN VELOCITY DETECTION routine 200, illustrative of steps carried out in accordance with preferred embodiments of the present invention to determine a velocity at which a selected head will no longer be aerodynamically supported and will touch down on the disc. It will be understood that the routine of FIG. 5 is preferably carried out separately for each head-disc combination in the disc drive 100, and that the heads 118 remain disposed over the landing zones 120 during the entirety of the routine.

At step 202, the discs 108 are initially accelerated to bring the discs to an initial rotational velocity sufficient to cause the heads 118 to separate from the discs 108 and to be aerodynamically supported thereover at a nominal flying height. While the heads 118 are so positioned, an appropriate read bias current magnitude is selected and applied to a selected head 118. As shown by step 206, an appropriate thermal asperity threshold level is next selected; this value may be selectable based on the capabilities of the preamp 132, or may be set by the preamp manufacturer. At this point it will be understood that although the threshold capabilities of the preamp 132 have been suggested as a preferable and convenient methodology, other methodologies, such as connecting additional circuitry to the disc drive 100 to access and detect the readback signals, are readily envisioned as falling well within the spirit and scope of the claimed invention.

The routine proceeds to initiate deceleration of the discs 108 at step 208. Such deceleration can be gradual and stepwise through a controlled sequence of reduced velocity control commands to the spindle motor control circuit 152, or alternatively can be carried out simply by removing the application of power to the spindle motor 106 (i.e., "turning off" the spindle motor and allowing the discs to come to rest).

As the discs are decelerated, the heads 118 will gradually lose altitude and eventually touchdown onto the discs 106 at a point when the rotational velocity of the discs is just insufficient to continue to aerodynamically support the heads. Accordingly, as shown by step 210 the readback signal obtained from the read element is monitored as the discs decelerate until the selected head 118 contacts the disc 108, at which point a large thermal asperity event will occur; thus, the touchdown point is determined when the readback signal amplitude exceeds the threshold. The velocity of the discs at this point is thereafter identified as the touchdown velocity, and the routine ends at 212.

Figure 6:
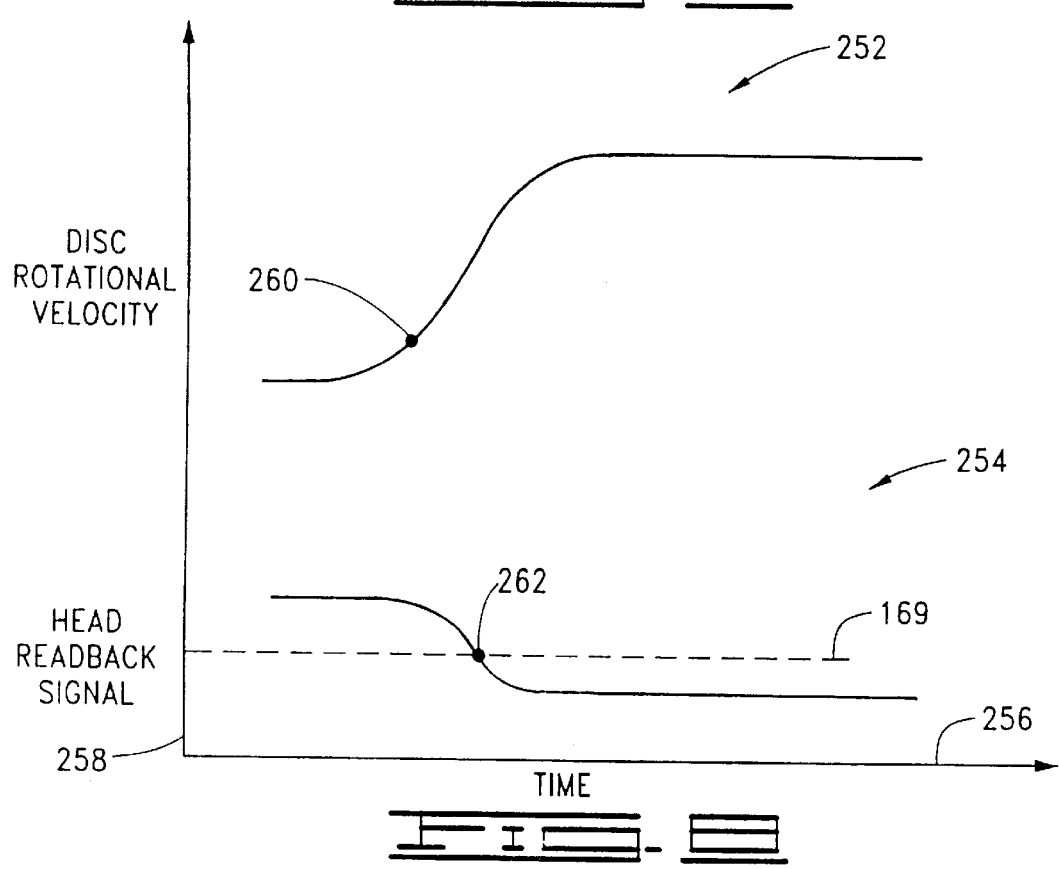
FIG. 6 provides graphical representations of the deceleration of the discs of FIG. 1 and detection of the point at which the head lands on the disc as indicated by a change in the readback signal.

FIG. 6 provides a graphical illustration of the operation of the routine of FIG. 5. In FIG. 6, both a disc rotational velocity curve 214 and a head readback signal curve 216 are plotted against common x, y-axes 218, 220. While the readback signal curve 216 would likely exhibit some level of background noise, such has been omitted from FIG. 6 for clarity of illustration.

Once the disc 108 achieve the initial rotational velocity (as indicated by point 222), the disc 108 decelerates until contact is made with the head 118, as indicated by a step-wise boundary increase at 224 in the readback signal 216. The touchdown velocity is correspondingly shown at 226. After the head 118 has come into contact with the disc 108, the disc 108 will continue to rotate, thereby continuing to generate frictional heating of the head 118. However, since such operation may provide undesired degradation of the read element, the read bias current is preferably removed from the head 118 once the increase 224 is detected (as generally indicated by broken line 228).

The velocity of the disc 108 can be monitored in a variety of ways. For example, the aforementioned host computer 140 can be provided with a data acquisition card that monitors the spindle motor (such as through back electromotive force signals), thereby obtaining a series of velocity measurements at a selected sampling frequency. Alternatively, data can be collected regarding the rate (deceleration versus elapsed time) at which the disc 108 stops when power is removed from the spindle motor and, if sufficiently repeatable, can allow the touchdown velocity to be calculated in relation to the elapsed time from when the power is removed from the spindle motor 106 until the time of the thermal asperity event (boundary 224). Other methodologies can be used as well, depending upon the requirements of a given application.

Referring now to FIG. 7, shown therein is a HEAD TAKE OFF VELOCITY DETECTION routine 240, illustrative of steps carried out in accordance with preferred embodiments to determine a velocity at which a selected head just begins to be aerodynamically supported by the rotation of the disc 108. The routine of FIG. 7 is similar to the routine of FIG. 5 and it will be understood that the routine is performed with the heads 118 disposed over the landing zones 120.

The discs 108 are first accelerated at step 242, with the selected head 108 in contact with the associated landing zone surface. An appropriate read bias current and thermal asperity threshold level are selected and applied at steps 244, 246, as shown. To reduce the possibility of head degradation, it may be preferable to reduce the magnitude of the read bias current applied at step 244; moreover, depending upon the particular construction of the head, it may be determined to forego entirely performing the routine of FIG. 7 in a manufacturing environment on customer product, instead limiting the routine to engineering evaluation models, since the long term effects of applying read bias currents to heads in contact with discs may not be fully known.

Thereafter, the take off velocity is determined by monitoring the readback signal and identifying when the signal falls below the threshold level. Since once the head 118 lifts off and separates from the disc 108, the frictional heating caused by disc/head contact will be removed and the head 118 will transition to a normal thermal equilibrium state. The routine then ends at 250.

FIG. 8 provides a graphical representation to further illustrate the operation of the routine of FIG. 7. As before, FIG. 8 provides a disc rotational velocity curve 252 and a head readback signal curve 254 plotted against common x, y-axes 256, 258.

From FIG. 8, it will be noted that as the discs accelerate, the selected head 118 will eventually take off. This will occur at the take off velocity, as indicated at 250. The readback signal will not instantaneously transition to the baseline level, but will shortly thereafter drop, crossing the threshold level at point 262. Since the transition rate of the head 118 can be empirically characterized, it will thereafter be straightforward to calculate the take off velocity (point 260) based on the time at which the threshold cross-over (point 262) occurs.

It will now be understood that the present invention as embodied herein presents an advantageous, noninvasive and easily implemented methodology for evaluating head flight characteristics. Although separate routines have been provided to determine head take off and touchdown velocities, it is contemplated that both will be performed in conjunction. Alternatively, since in many cases the head take off velocity will substantially equal the head touchdown velocity, it is further contemplated that the routine of FIG. 5 can be used to determine valid estimates for both take off and touchdown velocities.

Once the head takeoff and touch down velocities have been determined, the distance (such as in disc revolutions) that the head remains in contact with the disc before take off and after touchdown can be readily determined, such as through integration of the respective velocity profiles or through the use of a separate tachometer signal obtained from the motor. A separate optical encoder can also be used to count timing marks on the spindle motor to obtain distance information, but such an approach requires removal of the disc drive top cover.

Although the head will take off and touchdown at substantially the same velocity, the time that the head remains in contact with the disc before take off may be different from the time that the head remains in contact after touchdown, since acceleration and deceleration rates can differ. For example, a disc drive with a nominal operational disc velocity of 10,000 revolutions per minute (RPM) might have head take off and touchdown velocities of about 3,000 RPM, but it might take 30 revolutions before the heads take off and 60 revolutions after touchdown before the discs come to a stop. It has generally been observed that successive generations of sliders, while flying and operating with greater precision at higher disc operational rotational velocities, are generally taking longer to take off and land, resulting in greater lengths of time with the heads in contact with the rotating discs. Hence, it becomes increasingly important to be able to determine head take off and touchdown velocities to evaluate disc drive reliability performance.

In view of the foregoing, it will now be recognized that the present invention is directed to a method for evaluating flight characteristics of a head in a disc drive. In accordance with preferred embodiments, a methodology is presented to identify a head touchdown velocity. A disc 108 of a disc drive 100 is first accelerated to an initial rotational velocity sufficient to aerodynamically support a head 118 over the disc at a nominal flying height (step 202). Next, an appropriate read bias current of selected magnitude is applied to a read element 170 of the head to generate a readback signal determined in relation to voltage drop across the read element (step 204). A thermal asperity threshold level is also selected and applied which the readback signal exceeds in response to contact between the head and the disc as the disc rotates (step 206).

Thereafter, the head touchdown velocity is determined as a velocity just insufficient to aerodynamically support the head by decelerating the disc to decrease the flying height of the head and detecting subsequent contact between the head and the disc when the readback signal exceeds the thermal asperity threshold level (steps 208, 210).

Further, a methodology is provided to determine a head take off velocity. First, rotation of the disc is initiated while the head remains in contact with the disc (step 242). Next, appropriate read bias currents and thermal asperity threshold levels are selected and applied (steps 244, 246). The head takeoff velocity is thereafter determined as a velocity just sufficient to aerodynamically support the head by detecting lift off of the head from the disc as the readback signal falls below the thermal asperity threshold level (step 248).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for evaluating flight characteristics of a head of a disc drive, comprising steps of:
   (a) accelerating a recording disc of the disc drive to an initial rotational velocity sufficient to aerodynamically support the head over the disc at a nominal flying height;
   (b) applying a read bias current of selected magnitude to a read element of the head to generate a readback signal determined in relation to voltage drop across the read element;
   (c) identifying a thermal asperity threshold level which the readback signal exceeds in response to contact between the head and the disc as the disc rotates; and
   (d) determining a head touchdown velocity as a velocity just insufficient to aerodynamically support the head by decelerating the disc to decrease the flying height of the head and detecting subsequent contact between the head and the disc when the readback signal exceeds the thermal asperity threshold level.

2. The method of claim 1, wherein the velocity of the disc is repetitively measured during the operation of step (d).

3. The method of claim 1, further comprising an initial step of determining a characteristic rate of deceleration of the disc from a nominal operational rotational velocity to rest versus elapsed time in response to removal of power to a spindle motor used to rotate the disc, and wherein the touchdown velocity is determined in relation to elapsed time between the removal of power to the spindle motor and the exceeding of the thermal asperity threshold level by the readback signal.

4. The method of claim 1, further comprising a step of:
   (e) determining a head takeoff velocity as a velocity just sufficient to aerodynamically support the head by accelerating the disc from a velocity less than the head touchdown velocity to a velocity greater than the head touchdown velocity and detecting subsequent separation of the head from the disc as the readback signal falls below the thermal asperity threshold level.

5. The method of claim 4, wherein the velocity of the disc is repetitively measured during the operation of step (e).

6. The method of claim 4, further comprising an initial step of determining a characteristic rate of acceleration of the disc from rest to a nominal operational rotational velocity versus elapsed time in response to application of power to a spindle motor used to rotate the disc, and wherein the takeoff velocity is determined in relation to elapsed time between the application of power to the spindle motor and the falling of the readback signal below the thermal asperity threshold level.

7. A method for evaluating flight characteristics of a head of a disc drive, comprising steps of:
   (a) initiating rotation of a disc of the disc drive while the head remains in contact with the disc;
   (b) applying a read bias current of selected magnitude to a read element of the head to generate a readback signal determined in relation to voltage drop across the read element;
   (c) identifying a thermal asperity threshold level which the readback signal crosses in response to contact between the head and the disc as the disc rotates; and
   (d) determining a head takeoff velocity as a velocity just sufficient to aerodynamically support the head by detecting lift off of the head from the disc as the readback signal falls below the thermal asperity threshold level.

8. The method of claim 7, wherein the velocity of the disc is repetitively measured during the operation of step (d).

9. The method of claim 7, further comprising a prior step of determining a characteristic rate of acceleration of the disc from rest to a nominal operational rotational velocity versus elapsed time in response to application of power to a spindle motor used to rotate the disc, and wherein the takeoff velocity is determined in relation to elapsed time between the application of power to the spindle motor and the falling of the readback signal below the thermal asperity threshold level.

10. The method of claim 7, further comprising a step of:
    (e) determining a head touchdown velocity as a velocity just insufficient to aerodynamically support the head by decelerating the disc to decrease flying height of the head and detecting subsequent contact between the head and the disc when the readback signal exceeds the thermal asperity threshold level.

11. The method of claim 10, wherein the velocity of the disc is repetitively measured during the operation of step (e).

12. The method of claim 10, further comprising a prior step of determining a characteristic rate of deceleration of the disc from a nominal operational rotational velocity to rest versus elapsed time in response to removal of power to a spindle motor used to rotate the disc, and wherein the touchdown velocity is determined in relation to elapsed time between the removal of power to the spindle motor and the exceeding of the thermal asperity threshold level by the readback signal.

* * * * *